Inventor.
Hermann D. Schneider

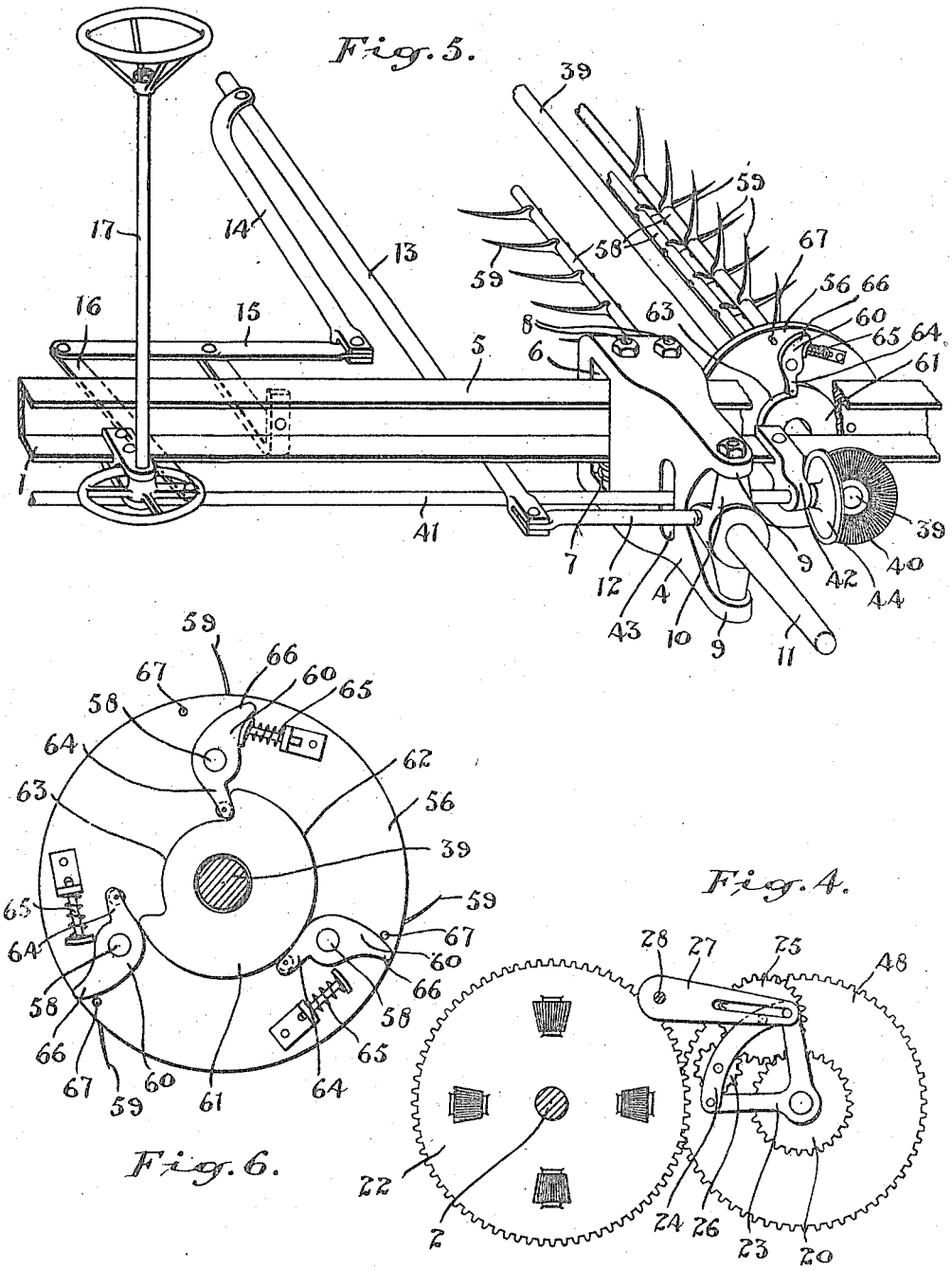

UNITED STATES PATENT OFFICE.

HERMANN DAVID SCHNEIDER, OF MILVERTON, ONTARIO, CANADA.

SHOCK-GATHERER.

1,255,470.                Specification of Letters Patent.        Patented Feb. 5, 1918.

Application filed February 24, 1916. Serial No. 80,118.

*To all whom it may concern:*

Be it known that I, HERMANN D. SCHNEIDER, a subject of the King of Great Britain, and resident of the village of Milverton, county of Perth, Province of Ontario, in the Dominion of Canada, have invented certain new and useful Improvements in Shock-Gatherers, described in the following specification and illustrated in the accompanying drawings, that form part of the same.

The principal objects of the invention are, to effect a saving of time and labor in gathering grain from the field, thereby reducing the cost and minimizing the danger of loss with large crops through changes of weather conditions.

A further object is to devise a machine which will lift the shocks clear of the ground and deposit same in transporting vehicles with a minimum amount of shaking, thereby reducing the loss due to threshing or shelling of the grain.

A still further object is to provide means for catching the major portion of the grain which may be threshed out in being handled by the gathering machine, and to devise a power driven machine which can be handled effectively in traversing uneven ground and in which the operator will have full control of the driving and gathering mechanism.

The principal features of the invention consist in the novel construction and arrangement of parts, whereby the sheaves are lifted from the ground and conveyed upwardly by an inclined carrier and discharged from the side of the machine in continuous travel, and whereby the gathering, elevating and traction guiding mechanisms are controlled by a guiding control mechanism arranged at one side of the machine.

In the accompanying drawings, Figure 1 is a perspective view of a machine constructed in accordance with this invention, the front wheel on one side being indicated in dotted lines.

Fig. 4 is an enlarged elevational detail of the traction controlling gear.

Fig. 5 is an enlarged perspective detail of a portion of the forward end of the main frame showing one of the steering wheel supports and control and a portion of the sheave engaging mechanism.

Fig. 6 is an enlarged elevational view of the cam mechanism controlling the movement of the sheave engaging members.

Like numerals of reference indicate corresponding parts in each figure.

Figure 1:
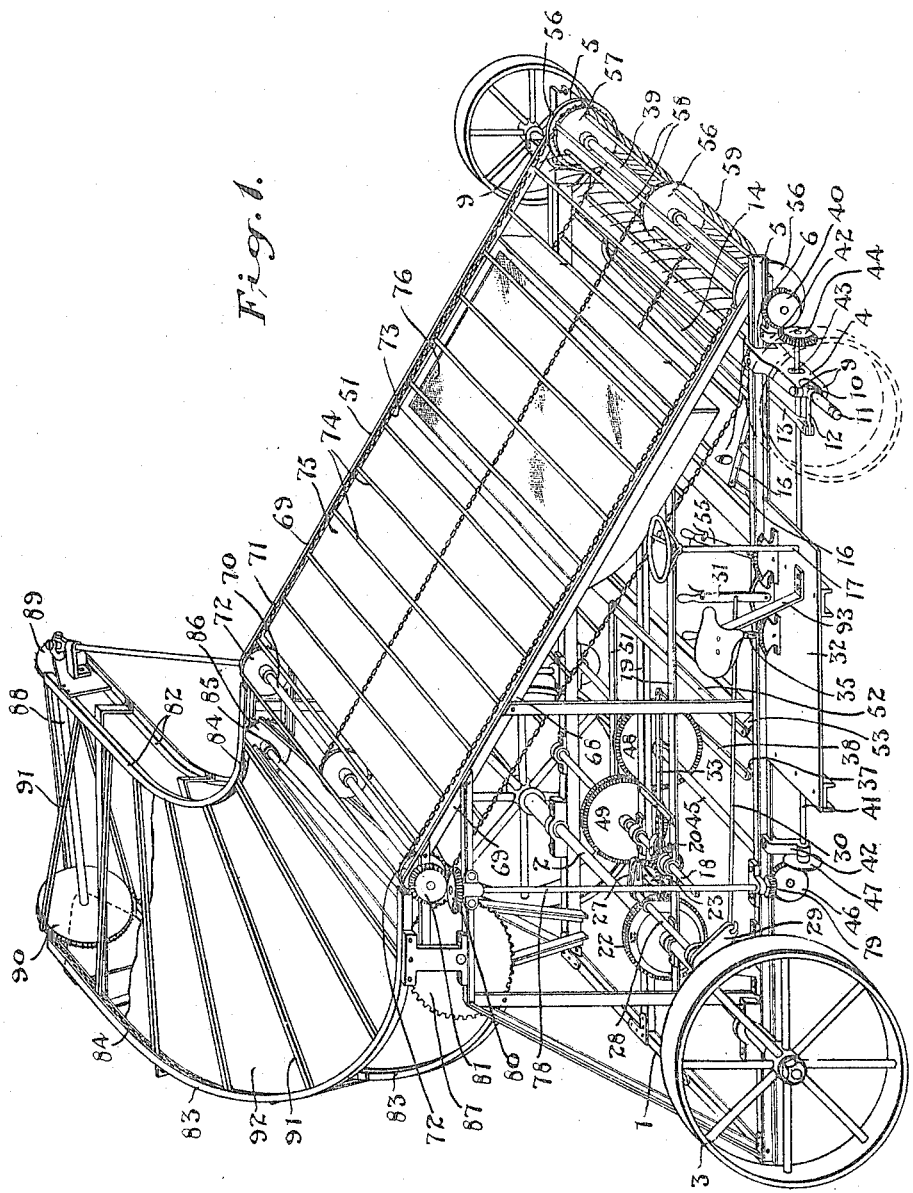
Figure 2:
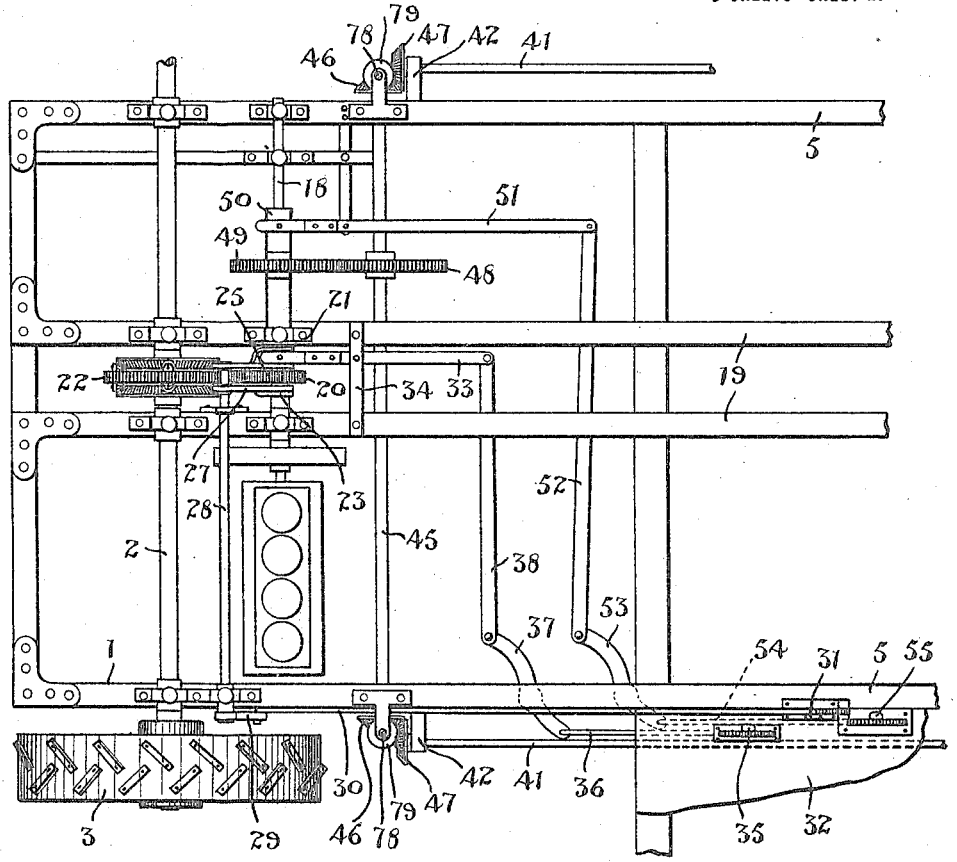
Fig. 2 is an enlarged detail plan view of the rear portion of the lower frame of the machine, showing the traction and elevator controls.
Figure 3:
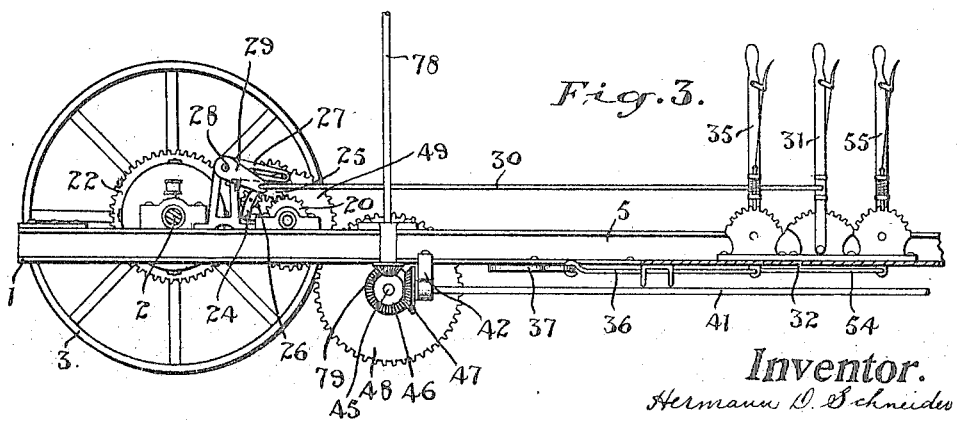
Fig. 3 is a side elevational view of the details shown in Fig. 2, the traction wheel being removed and indicated in dotted lines.

Referring to the drawings, 1 is the main frame of the machine which is preferably rectangular and formed of suitable steel and channel bars.

2 is the rear driving axle journaled in suitable bearings in the main frame and carrying the traction wheels 3.

4 are the front wheel supporting-brackets here shown secured to the forward ends of the side bars 5 of the main frame each having a slot 6 through which the side bars extend.

The slot 6 is sufficiently deep to allow of considerable vertical movement of the bracket upon the bar and coiled cushion springs 7 are arranged beneath the side bar within the slot to support the weight of the frame.

The brackets are held in place by the vertical bolts 8 which extend through the flanges of the side bar. The outer ends of the brackets 4 are formed with projecting lugs 9 forming a jaw in which the knuckle member 10 carrying the front wheel axle 11 is pivoted.

12 are bars secured in the knuckles 10 and extending rearwardly therefrom, the bars of the two wheels being connected together by a cross bar 13, which bar is connected by the link and lever members 14, 15 and 16 to the steering standard 17.

18 is the main driving shaft driven by any suitable form of motor and supported transversely in horizontal bearings on the parallelly arranged longitudinal bars 19 forming part of the main frame.

20 is a spur gear rotatably mounted concentric with the main shaft 18 and adapted to be operatively connected with said main shaft by means of a suitable clutch 21.

22 is the center gear of the rear axle differential arranged in alinement with the gear 20 having spur teeth on its periphery.

23 is a yoke pivotally mounted to rotate coaxially with the main driving shaft and having a quadrant-shaped outer portion 24 upon which are journaled the spur gear 25 and pinion 26. The gear 25 meshes with the spur gear 20 and the pinion is in constant mesh with the gear 25.

Upon the partial rotation of the yoke member 23 upon its axis, the pinion 26 is brought into mesh with the gear 22 of the differential and a reverse drive for the rear axle is thus effected through the gears 20, 25, 26 and 22. If it is desired to drive the machine forwardly the yoke 23 is rotated to move the pinion 26 out of mesh with the gear 22 and to bring the spur gear 25 into mesh with the gear 22. The means for operating the yoke member comprises a slotted lever 27 supported upon a transverse shaft 28, the yoke member having a laterally extending pin extending through the slot of the lever.

29 is a crank arm on the outer end of the shaft 28.

30 is a rod connected to the crank arm 29 and leading forwardly to a controlling lever 31 supported upon the controlling platform 32 which is secured to the main frame and extends outwardly therefrom, said lever having a suitable toothed quadrant lever control for holding same in various positions.

33 is a lever operatively connected with the clutch arranged upon the main driving shaft to engage the spur gear 20 to operate the same and through said spur gear 20 to operate the rear axle through the mechanism described. The lever 33 is pivotally supported intermediate of its length upon a cross bar 34 extending between the bars 19 and is operated from the quadrant lever 35 arranged on the platform 32 through the medium of the rod 36, lever 37 and link 38.

39 is a shaft mounted in bearings at the forward end of the frame 1 and extending across the machine.

40 are beveled gears secured on the outer end of the shaft 39 at the outer side of the frame.

41 are shafts extending longitudinally of the frame 1 and journaled in brackets 42 secured to the side bars 5. The shafts 41 extend through vertical slots 43 in the front wheel brackets 4 and do not interfere with the vertical movement of said brackets on their supports.

44 are bevel gears meshing with the gears 40.

45 is a shaft extending transversely across the machine and journaled in bearings in the main frame having bevel gears 46 at the outer ends meshing with corresponding gears 47 arranged on the rearward ends of the shafts 41.

48 is a spur gear secured to the transverse shaft 45.

49 is a spur gear meshing with the gear 48 and rotatably supported coaxially with the main driving shaft 18.

50 is a clutch operatively connected with the gear 49 and adapted to connect the same with the main driving shaft.

51 is a clutch lever pivotally supported from the frame and operatively connected by a link 52, lever 53 and rod 54 to a controlling lever 55 arranged upon the platform 32. By the operation of the lever 55 the clutch may be thrown into gear to operate the cross shaft 39 through the gear and shaft connections described.

56 are disks secured to the shaft 39 close to each end and at the inner side of the frame and also centrally of the width of the machine, the outer disks having their sprocket wheels 57 arranged upon their inner sides and the central disk having a sprocket-shaped periphery.

58 are shafts journaled in the disks 56 and spaced radially equidistant from the center of the shaft 39 and extending completely across the machine. The shafts 58 are provided with a plurality of tines 59 secured thereto at suitable intervals throughout their length. These tines are adapted to engage the sheaves and to lift them from the ground as the disks are rotated.

60 are cam members secured to the ends of the shafts 58 on the outer sides of the outer disks 56.

61 is a stationary cam rigidly secured to the sides of the frame between the said sides and the outer face of the outer disks 56 having the concentric portion 62 and a reduced portion 63.

The cams 60 are formed with arms 64 adapted to contact with the concentric portion 62 of the cam 61 to ride thereon during the major portion of the rotation of the disks, said arms being adapted to drop into the reduced portion to allow the tines to swing backward at the upward part of their movement so as to be withdrawn from engagement with the sheaves without tearing or retarding their movement.

65 are spring plungers secured to the outer sides of the disks and adapted to engage the outer arms 66 of the cams 60 as the shafts 58 rotate, said plungers cushioning the backward movement of the cams and limiting the backward movement of the tines.

As the shaft 39 rotates the disks 56 are rotated thereby and the shafts 58 are carried in a circular orbit, the tines 59 projecting outwardly.

The inner portions 64 of the cams 60 engage the concentric portion 62 and are held from swinging forward by means of the pins 67 secured in the disks to limit the movement by engaging the outer arms 66 of the cams. The tines are thus rotated close to the surface of the ground and pick up any loose grain in rotation and coming into contact with the butts of the sheaves in a shock are projected into the same lifting the sheaves upwardly and carrying them rearwardly to be deposited on an elevator structure to be hereinafter described.

As the tines reach the upper position in their orbit the cam ends 64 through the pressure against the sheaves drop into the reduced portion of the cams 63, thus turning the tines backwardly so as to withdraw them from the sheaves approximately in a direct line. The tines travel around about a quarter of a revolution on the back part of their orbit. In this position and upon the arms 64 engaging the larger portion of the stationary cam the tines are again moved to their engaging position.

68 is a frame in the form of an incline superstructure supported upon the main frame 1, the side bars 69 being rigidly secured to the side bars 5 at the front of the machine and rising upwardly to the desired height for elevating the sheaves, that is, a distance sufficient to carry the sheaves well above the ordinary transporting vehicle.

70 is a shaft journaled in suitable bearings at the upper end of the inclined portion 71 of the upper frame and upon which sprocket wheels 72 are arranged in alinement with the sprockets 57 on the shaft 39.

73 are endless chain belts extending around the sprockets 72 and 57.

74 are cross slats secured to the chain belts 73 at regular intervals. A shield 75 presenting a smooth surface is arranged beneath the upper portion of the endless carrier and a screen 76 is arranged at the bottom of this shield, said screen being adapted to allow any shelled grain to pass therethrough, a suitable receptacle being arranged therebeneath.

78 are vertically arranged shafts journaled in bearings supported upon the frame of the machine at each side and each having a beveled pinion 79 at the lower end meshing with the beveled gears 46. The upper ends of the shafts 79 are provided with beveled gears 80 meshing with corresponding gears 81 on the ends of the shaft 70. It will thus be seen that the upper and lower ends of the chain belts are driven in unison.

82 are a pair of channel bars bent into quarter circle formation and rigidly supported upon the super-structure and having outwardly extending end portions projecting well beyond one side of the frame, the grooved sides of said channels being turned inwardly.

83 are channel bars arranged in a pair and spaced vertically apart a considerable distance greater than the bars 82, the latter bars being arranged at the opposite side of the machine and bent to conform to the same center as the inner pair of bars, the whole forming a double track-way the upper track of which is arranged horizontally to form a right angle turn and adapted to guide carrier chains 84 which slide in the grooves of the channels.

It will be obvious that a greater length of chain will be required on the larger radius of bend, consequently the sprockets for carrying the chains on the outer sides require to be considerably larger than those on the inner sides.

85 is a shaft arranged adjacent to the shaft 70 and having a small sprocket 86 upon one end and a large sprocket 87 upon the other end.

88 is a shaft arranged at the outer ends of the quarter bent frame carried in suitable journals between the upper and lower bars, said shaft having a small sprocket 89 at the forward side and a large sprocket 90 at the rearward side. The chain belts sliding in the grooved channel members extend around the pairs of sprockets and support transversely extending slats 91 which on the upper side travel over a smooth surface 92, returning on the underside.

The shaft 88 is driven by means of a shaft 94 operatively connected with the shaft 70 and connected by suitable toggle joint connections.

The operator of the machine occupies the seat 93 arranged upon the platform 32 and by means of the steering wheel and levers controls the movement of the various parts. The engine for operating the device is not shown in the perspective drawing but is indicated in the plan view. The machine is driven as a self-propelled vehicle and when it is desired to operate the gathering mechanism the driving connections are thrown into mesh so as to rotate the shaft carrying the lifting tines. These rotate in a forward direction and digging into the sheaves of the shock lift the same bodily upward, depositing them heads upward on the inclined endless carrier which conveys them upwardly to the desired level. The quarter turn carrier engages the sheaves arriving at the top of the incline and carries them onward and around the right angle bend in a continuous movement so that there will be no dropping or throwing of the sheaves in order to deliver them to the side of the machine.

A machine constructed as described may be driven over a field and will operate upon any kind of ground. The rotating tines extending completely across the front of the machine glean any loose grain lying on the ground and transmit it to the conveyer. The machine is directed from place to place to pick up the shocks and suitable wagons are driven alongside to receive the load so that the machine will operate continuously with the result that a large quantity of grain may be lifted from the ground in the minimum amount of time and with the minimum amount of expenditure for labor.

The machine is designed particularly to avoid as far as possible the threshing out of the grain and whatever may be shelled out in the upward travel over the conveyer will not be lost.

What I claim as my invention is:—

1. In a shock gatherer, a lifting reel comprising a shaft journaled at the front of the machine, disk members secured to said shaft, a plurality of shafts journaled in said disks and spaced equidistant from the center shaft and each having a plurality of rigid tines, means for holding said tines rigidly in the extended position, means for turning said shafts in their bearings to alter the position of the tines to withdraw same from the sheaves, and yielding means for supporting the tines in the altered position.

2. In a shock gatherer, a lifting reel comprising a shaft journaled at the front of the machine, disk members secured to said shaft, a plurality of shafts journaled in said disks and spaced equidistant from the center shaft and each having a plurality of rigid tines, cam members secured on the ends of said shafts, stationary cams adapted to engage said cam members and having circumferential portions extending the major portion of the orbit of rotation to hold said cams and the tines carried thereby rigidly extended, said stationary cams having recessed portions adapted to allow of the swinging of the cams to release the tine shafts and allow the tines to swing backwardly as they are being withdrawn from the sheaves, and yielding means engaging said tine shaft cams in their altered positions.

3. In a shock gatherer, a lifting reel comprising a shaft journaled at the front of the machine, disk members secured to said shaft, a plurality of shafts journaled in said disks and spaced equidistant from the center shaft and each having a plurality of rigid tines, cam members secured on the ends of said shafts, stationary cams adapted to engage said cam members and having concentric portions extending the major portion of the orbit of rotation adapted to hold said cams and the tines carried thereby in rigid extended positions, said stationary cams having recessed portions adapted to allow of the swinging of the cams on said tine shafts to release the tine shafts and allow the tines to swing backwardly as they are being withdrawn from the sheaves, and spring cushion members secured to said disks adapted to engage and cushion the tine shaft cams in their backward movement.

4. In a shock gatherer, a lifting reel comprising a shaft journaled at the front of the machine, disk members secured to said shaft, a plurality of shafts journaled in said disks and spaced equidistant from the center shaft and each having a plurality of rigid tines, stationary cams arranged outside the outer of said disks, each having a concentric portion engaging the tine shaft cams and holding the tines in rigid extended positions, said cams having a recess in the top rear portions, cams secured on the ends of said shafts each having rollers on their inner ends to engage the stationary cams and to hold the tines in an extended position, said inner ends being adapted to swing into the recesses in the stationary cams to allow the tine shafts to swing backwardly as the sheaves are being discharged, positive stops on said disks to engage the outward ends of said tine shaft cams when the rollers are in engagement with the larger concentric part of the stationary cams, and yielding stops adapted to engage said tine shaft cams as they swing rearwardly in delivering the sheaves.

5. In a shock gatherer, a frame, a rotatable shock gathering member arranged at the front of said frame, shafts extending longitudinally of said frame and journaled in bearings secured to said frame at the sides and operating said shock gathering member, a driving shaft extending transversely of said frame and operating said longitudinal shafts, means for driving said driving shaft, an endless carrier extending upwardly from said gatherer, a rear axle and traction wheels, and bracket members secured to said frame and carrying swinging front wheels, said brackets having vertical slots therein through which the frame extends, and springs arranged in said slots to support said frame.

HERMANN DAVID SCHNEIDER.

Copies of this patent may be obtained for five cents each, by addressing the "Commissioner of Patents, Washington, D. C."